United States Patent

[11] 3,576,236

[72] Inventor Bernard Laverdant
Vincennes, France
[21] Appl. No. 803,153
[22] Filed Feb. 28, 1969
[45] Patented Apr. 27, 1971
[73] Assignee Societe Anonyme D.B.A.
[32] Priority Mar. 6, 1968
[33] France
[31] 142,612

[54] TANDEM HYDRAULIC BRAKE ACTUATOR
6 Claims, 4 Drawing Figs.
[52] U.S. Cl. ........................................... 188/152,
188/106
[51] Int. Cl. ............................................ B60t 11/10
[50] Field of Search ........................................... 188/106
(F), 106 (P), 152.02, 152.873

[56] References Cited
UNITED STATES PATENTS
3,490,565 1/1970 Marschall et al. ............... 188/106(P)
2,497,438 2/1950 Butler .......................... (188/106P)UX
3,465,852 9/1969 Belart ............................ 188/152(02)
3,476,220 11/1969 Kobayashi ..................... (188/152.02)
FOREIGN PATENTS
1,469,777 1/1967 France .......................... 188/106(F)

*Primary Examiner*—George E.A. Halvosa
*Attorneys*—Plante, Arens, Hartz, Hix and Smith and C. F. Arens ABSTRACT: A tandem hydraulic brake actuator having in a bore a brake actuating piston responsive to a first hydraulic control pressure, a floating piston responsive to the pressure differential between said first and second control pressures so as to move said control piston in a brake-applying direction in the event of a failure in said first control pressure, a slack adjuster operatively provided between said pistons and means operative to prevent actuation of said floating piston as long as the pressure differential acting thereon is below a predetermined value.

PATENTED APR 27 1971

TANDEM HYDRAULIC BRAKE ACTUATOR

This invention relates to a tandem hydraulic brake actuator for a split hydraulic control system adapted to supply same with at least two separate hydraulic control pressures so that in the event of a failure in the system portion controlling one of said control pressures the brake can be operated normally.

It has been already proposed fluid pressure brake actuators of the type comprising two pistons slidably mounted into two separate cylinder bores operatively arranged in tandem or in opposed relationship so as to actuate the brake in response to control actuation from anyone of two separate control pressures acting on said two control pistons respectively. Such an actuator arrangement cannot be considered as satisfactory even though it is provided with a suitably located wear adjuster. In effect as easily understood by anyone skilled in the art, it results on the one hand in a substantial increase of the axial sizes of the brake actuator whenever the space available for such an actuator, more particularly for spot-type disc brakes, is very limited and on the other hand in a braking applying force which depends upon the control pressure which is operative to control the actuator since the two control pistons are not provided with the same braking efficiency to permit using only one wear adjuster.

It has been also already proposed fluid pressure brake actuator of the tandem type comprising in a common cylinder bore a control piston responsive to one of the control pressures for actuating the brake and a floating piston having its opposite faces subjected to said two separate control pressures respectively so as to engage the control piston for moving the same in a brake-applying direction in the event of a failure in said one control pressure.

With such a brake actuator, if it assumed that the floating piston is (hydraulically or resiliently) maintained in a relatively fixed position, it will be recognized that the axial distance between the control and floating piston increases as the wear of the brake friction element which is connected to be actuated by the control piston, increases as a result of the frictional engagement of the friction element with the relatively movable surface (disc or drum) driven by the wheel to be braked. Upon a failure in the control pressure controlling actuation of the control piston, it will be understood that the floating piston must be moved along this axial distance so as to engage the control piston, which thereby requests a substantial hydraulic liquid displacement. If it is assumed, as it is generally the case, that the two separate hydraulic control pressures are generated by a tandem master cylinder, the above request of hydraulic flow requires a large input displacement of the brake control pedal which cannot be always realized due to the operative travel which remains available on the brake pedal whenever such a failure occurs in one portion of the system. Furthermore, such a large inward displacement of the brake pedal is quite unpleasant for the vehicle operator upon an emergency brake control actuation.

With the above tandem brake actuator, it will be also understood that if the floating piston is (hydraulically or resiliently) maintained in substantial engagement with the control piston, a failure in the system portion controlling the hydraulic pressure acting on the floating piston would result in corresponding displacement of the later away from the control piston and thereby in a large hydraulic flow request for maintaining the control pressure acting on the control piston at a constant value so that the above-mentioned drawback is not avoided.

The main object of the invention is to provide a compact tandem hydraulic brake actuator arrangement avoiding the above drawbacks and permitting generating substantially equal brake-applying forces when actuated by anyone of two separate control pressures respectively.

According to the main feature of the invention there is provided a tandem hydraulic brake actuator for a split braking control system adapted to supply at least two separate hydraulic control pressures characterized by comprising in a cylinder bore a movable control piston responsive to one of said two separate control pressures and adapted to be moved thereby in a brake-applying direction, a floating piston responsive to the pressure differential between said two control pressures so as to be moved in a brake-applying direction by the other of said control pressures when said differential pressure is above a predetermined value as a result of a failure in said one control pressure, and a force transmitting mechanism including an automatic adjuster operatively connected to said control piston and said floating piston.

According to another feature of the invention there is provided a tandem hydraulic brake actuator as set forth hereinabove wherein an annular abutment seal is provided between a relatively fixed partition wall provided in said cylinder bore and the face of said floating piston which is subjected to the other of said separate control pressures whereby said floating piston is maintained in a substantially sticky engagement with said partition wall as long as the differential pressure acting on said piston is below said predetermined value. With such an arrangement it will be understood that the total effective area of the floating piston is subjected to the said other control pressure in the event of a failure in said one pressure so that for a given input control pressure the brake-applying force from said floating piston is substantially equal to the brake-applying force normally generated by said control piston.

Other features and advantages of the invention will appear from the following description taken in connection with the accompanying drawings in which.

Figure 1:
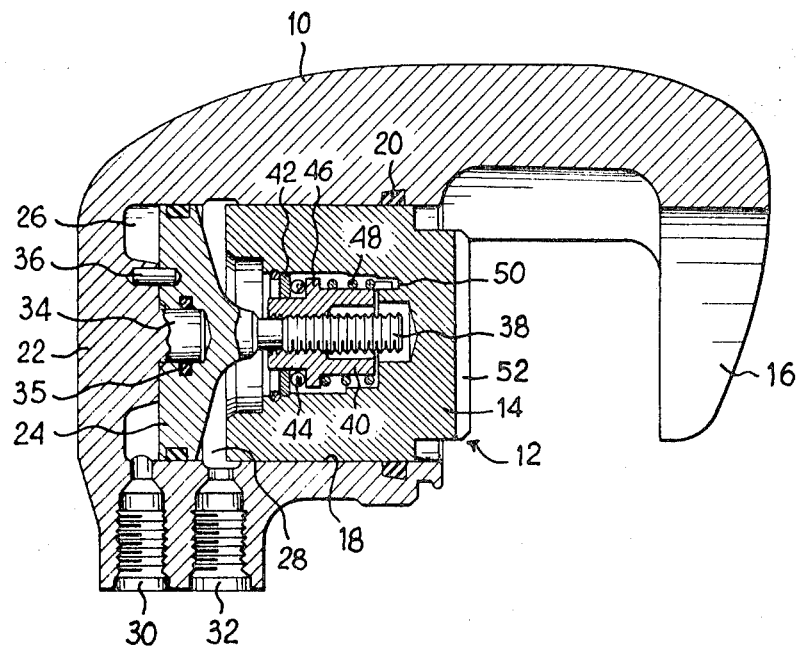
FIG. 1 is a cross-sectional view of a floating type stirrup for a disc brake including a tandem brake actuator according to the invention.

In FIG. 1, there is shown a unitary caliper or stirrup 10 comprising a brake actuator generally designated by reference numeral 12 and comprising a piston 14 the outer face of which is provided to be applied against a pad (not shown), the other pad (also not shown) bearing against a reaction arm 16 of caliper 10. Anybody conversant in the art knows very well brakes of this type in which a floating or sliding caliper straddles the pads and the disc located between said pads.

Piston 14 is mounted in a bore 18 provided in the body of caliper 10, the sealing between the bore and the piston being obtained by means of a ring 20 also providing the return of piston 14. Between piston 14 and the bottom 22 of bore 18 is provided a piston 24 which will be designated as floating piston, piston 14 being called control piston. As shown on the drawing of FIG. 1, pistons 14 and 24 defined in bore 18 two chambers 26 and 28. Chamber 26 is defined by bottom 22 of stirrup 10 and floating piston 24 and chamber 28 is defined by the face of the floating piston 24 opposite to one which is adjacent to the bottom and the rear face of piston 14. Fluid inlets 30 and 32 connected to distinct pressure fluid systems open into chambers 26 and 28 respectively. Bottom 22 comprises a cylindrical portion projecting out of said bottom, said portion 34 cooperating with a blind hole provided in piston 24 and comprising in its inner wall a groove in which is located a sealing ring 35. Projecting portion 34 is preferably located concentric with respect to piston 24. Between piston 24 and bottom 22, are provided means opposing the rotation of piston 24 about its axis, said means consisting in the shown example of a pin 36 projecting out of the bottom and entering piston 24.

Between floating piston 24 and control piston 14 is provided a connection constituting a unidirectional adjusting device which is such that as the pads of the brake wear, the piston 14 moves away from piston 24, the unidirectional device opposing the two pistons from coming closer to each other. Such a device consists, in the shown example of a threaded rod 38 solid with piston 24 or integral with the latter on which is threadedly mounted a sleeve 40. The thread between sleeve 40 a and rod 38 is of the reversible type and the pitch is very long. Sleeve 40 is capable of a slight displacement with respect to piston 14; to this effect there is provided a washer 42 maintained by a snap ring located in a groove provided in the inner wall of the piston. A thrust ball bearing 44 is located between washer 44 and a flange portion 46 of sleeve 40, said thrust bearing having for its object to facilitate the rotation of the sleeve. A helical spring 48 is wound around sleeve 40 with a slight clamping action and one of the ends of said spring is anchored in the recess 50 provided in the piston. The rotation of the piston is opposed thanks to the cooperation of a projection provided on the pad (not shown) with a rectilinear groove 52 provided on the external face of piston 14. Spring 48 constitutes a unidirectional clutch permitting the rotation in the lenghtening" direction of the assembly threaded rod —sleeve and opposing the rotation in the opposite direction. It can now be understood why is provided a pin 30 fixed between piston 24 and bottom 22 to oppose the rotation of the threaded rod 38 integral with said piston 24. The device which has just been described opposes efficiently any displacement of the piston toward the bottom of the cylinder as the pads wear. Of course, any kind of unidirectional device of the rotating type or not would be convenient to provide the connection between piston 24 and piston 14.

The operation of the brake actuator described hereinabove is the following:

In normal conditions, the inlet ports 30 and 32 are fed from two distinct master cylinders or from a split-type master cylinder with fluids under two pressures that are substantially equal. In view of the fact that the floating piston 24 is applied against the bottom 22 and that there exists friction forces opposing displacement of said piston, only the pressure acting in chamber 20 tends to move piston 14 toward the disc which results in the application by reaction of the two pads against the opposite faces of said disc. As the pads wear, the automatic adjusting device operates and the distance increases between piston 14 and piston 24. The latter remaining normally applied against bottom 22. In case of failure of the system connected to inlet port 30, the situation remains the same, piston 24 is only more firmly pressed against bottom 22. On the contrary, in case of failure of the system connected to inlet port 32, the fluid pressure from the system connected to inlet port 30 pushes piston 24 toward the pad adjacent to piston 14 and there is no lost motion stroke because of the provision of the unidirectional adjusting device between piston 24 and piston 14. It may be noted that whatever may be the failure in one system or the other the full brake power is maintained and lost motion stroke or the paddle controlling the master cylinder is avoided.

In the embodiment of FIG. 1, there has been shown a piston 24 maintained by friction and differential pressure against bottom 22 but, of course, the projections 34 could be avoided by providing the end portion of bore 18 with an area slightly less than the one of the rest of the bore in such a manner that the pressures applied to inlets 30 and 32 being substantially equal a stepped piston 24 be only subjected on its face defining chamber 26 to a relatively small force whereas its face defining chamber 28 would be submitted to a larger force.

Figure 2:
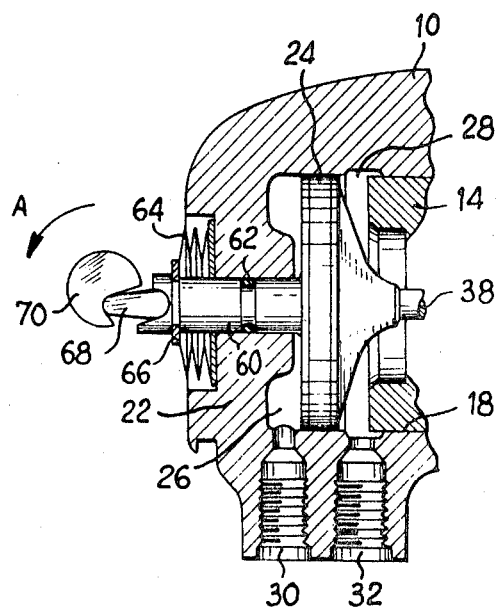
FIG. 2 is a cross-sectional view with parts broken away of a second embodiment of a tandem brake actuator more particularly adapted for a disc brake stirrup provided with a handbrake applying mechanism.

In the embodiment of FIG. 2 where the same references numerals designate elements which are similar or identical to those shown in FIG. 2, floating piston 24 comprises on its face opposite the one which carries threaded rod 38 a cylindrical projection 60 extending through the bottom 22 with provision of a seal 62. Piston 24 is urged toward bottom 22 by resilient washers 64 clamped between bottom 22 and a snap ring 66 secured to the cylindrical projection 60. The end of projection 60 comprises a slot in which is located a pivoting link 68 cooperating with a rotating cam means 70, the rotation of which in the direction of arrow A provides the motion of the assembly of piston 24 and 14 in the braking direction, cam means 70 being connected to a handbrake control. It will be noted that in the embodiment of FIG. 2, piston 24 is urged toward the bottom 22 by pressure differential when the pressures applied to inlet ports 30 and 32 are substantially equal and further more because of the friction forces existing between cylinder 60 and bottom 22 and also because of the resilient washers 64 provided to urge the whole structure toward bottom 22. With respect to the rotation of piston 24 about its axis, this rotation is opposed thanks to the shape of link 68 engaging the slot of cam means 70.

Figure 3:
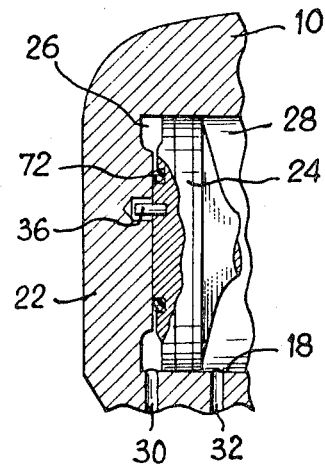
FIG. 3 shows in partial cross-sectional view a particular embodiment of the tandem actuator shown in FIG. 1.

The embodiment of FIG. 3 relates to a caliper for a brake which does not comprise any hand control. In this FIG. 3, the same reference numerals are used to designate elements which are substantially the same as those already described in FIG. 1. The piston 24 the rotation of which is opposed by pin 36 comprises on its face adjacent to bottom 22 a resilient ring 72 mounted in a groove which is preferably coaxial with bore 18, said ring cooperating with the wall of bottom 22. Thanks to such an arrangement, there is normally created during a normal operation of the brake, that is when fluids having substantially equal pressures act upon two faces of piston 24, a pressure differential is exerted on piston 24 since only the portion comprised between bore 18 and ring 72 of piston 24 adjacent bottom 22 is subjected to the pressure in chamber 26 whereas the other face of said piston 24 is subjected on its full area to the pressure in chamber 28.

Figure 4:
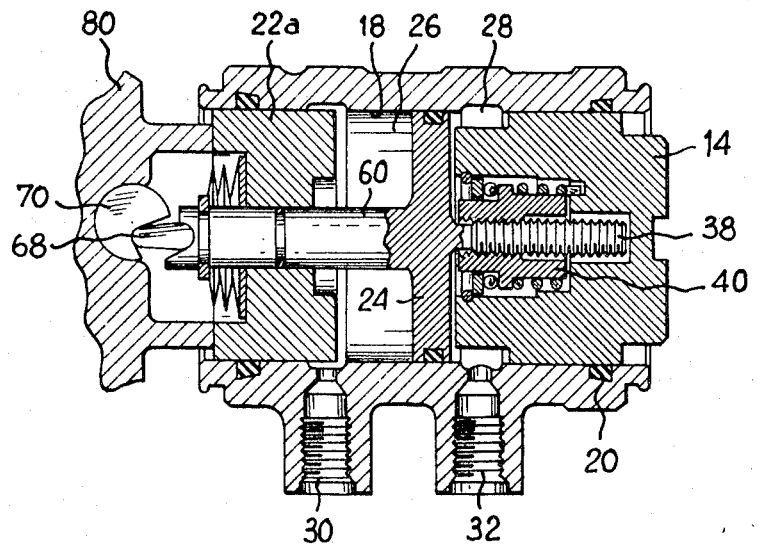
FIG. 4 is an axial cross-sectional view of a fourth embodiment of a brake actuator according to the invention more particularly adapted for a disc brake of the reaction frame type.

In the embodiment of FIG. 4, the brake actuator that is shown with the same reference numerals designating elements similar or identical to those of FIGS. 1 to 3 is provided to actuate a disc brake of the reaction frame type. To this effect, the bottom of bore 18, designated by reference numeral 22a is no longer solid with cylinder itself which in the embodiment of FIGS. 1 to 3 was integral with the stirrup 10. Bottom 22a is slidably mounted in a bore 18 and its external face opposite to the one in contact with the fluid in chamber 26 engages a frame 80 made of a sheet of metal having a substantial thickness. Reaction frame disc brakes are well known by the one skilled in the art. In such brakes, there is generally provided two opposed cylinders one urging one of the pads in contact with one face of the disc whereas the other piston acts onto the internal portion of the frame which transmits by reaction an effort tending to apply the other pad against the other face of the disc. In FIG. 4, there has been shown at the end of extension 60 solid with floating piston 24, a link 68 cooperating with cam means 70 bearing against the internal portion of the frame 80.

The operation of the device of FIG. 4 is the following:

In normal operation, when the pressures applied to inlet ports 30 and 32 are substantially equal, the transmission of effort toward frame 80 is effected by pushing piston 22a toward said frame with a slight complementary force transmitted through cylinder 60, link 68 and cam means 70 whereas piston 14 normally urges the pad adjacent thereto toward the disc.

In case of failure of the system connected to inlet port 30, piston 24 is no longer pressure balanced and thus transmits the efforts due to the pressure in chamber 28 to the frame 80 through the intermediary of projection 60, link 68 and cam means 70.

Contrarily, in case of failure of the fluid pressure system connected to inlet port 32 opening in chambers 28, the transmission of effort toward the frame is effected by piston 22a which is urged toward said frame, the assembly comprising piston 24, adjusting device and piston 14 moving toward the pad adjacent thereto.

Among the accompanying drawings, there is not shown any embodiment relating to a fixed stirrup disc brake comprising opposed cylinders but the man skilled in the art will understand that there can be easily provided two devices of the type shown in FIG. 1 symmetrically located with respect to the plane of disc to permit applying the invention in the case of a fixed stirrup disc brake with opposed cylinders.

The invention also applies to a brake actuator for a drum brake. It is in fact conceivable according to the teachings of the invention, a wheel cylinder for drum brake comprising two pistons similar to piston 14 mounted with their external faces projecting out of a through bore 18 of a wheel cylinder, the two pistons 14 being separated from each other by a floating piston of the same type as piston 24 but comprising symmetrically on both faces threaded rods 38 cooperating with unidirectional type adjusting devices. In other words in a wheel cylinder for drum brake according to the invention, there are provided, from the free end of the first segment: a piston similar to piston 14, a first unidirectional adjusting device connecting to piston 14 with floating piston similar to piston 22 and then another unidirectional adjusting device connecting the floating piston 24 to another piston similar to control piston 14, the latter engaging by its external face the free end of the other shoe of the drum brake. Of course, the unidirectional devices are such that the control pistons similar to piston 14 are adapted to move away from floating piston 24 without being capable of moving toward each other as the linings of the shoes or the drum brake wear.

I claim:

1. In a hydraulic brake actuator for use in a vehicle having first and second hydraulic systems:
   a housing defining a bore therewithin;
   a control piston slidable in said bore and responsive to fluid pressure in said first hydraulic system to be urged in a brake-applying direction thereby;
   a floating piston slidable in said bore;
   one face of said floating piston being subjected to fluid pressure in said first hydraulic system;
   the other face of said floating piston being subjected to fluid pressure in said second hydraulic system;
   a unidirectionally extendible force transmitting element disposed within said bore between said pistons for allowing said floating piston to urge said control piston in a brake-applying direction upon a failure in said first hydraulic system;
   said element extending upon relative movement of said control piston away from said floating piston in excess of a predetermined amount; and
   an annular seal operatively arranged between said other face of said floating piston and the wall of said bore to prevent fluid pressure in said second hydraulic system from acting upon the area of said other face defined within said seal, whereby said other face of said floating piston presents a smaller effective area against which fluid pressure may act than does said one face.

2. A hydraulic brake actuator, according to claim 1, wherein an offcenter pin is provided between said cylinder bore and said floating piston for opposing relative angular displacements between the floating pistons and said control piston.

3. A hydraulic brake actuator, according to claim 1, and preloaded resilient means operatively arranged between a relatively fixed portion of the housing and said floating piston for normally biasing the latter in engagement with a relatively fixed abutting surface.

4. A hydraulic brake actuator, according to claim 3, wherein said relatively fixed abutting surface is comprised of a cam surface on a movable control member pivotally mounted on said housing and adapted to be connected to auxiliary brake control means.

5. A hydraulic brake actuator, according to claim 1, wherein said annular sealing means is arranged between a tubular projection extending axially from said other face and the central cylindrical opening of an annular partition wall sealingly arranged in said cylinder bore.

6. A hydraulic brake actuator, according to claim 5, wherein the free end of said tubular piston projection is adapted to engage a cam surface on a movable control member pivotally mounted on said housing to be connected to an auxiliary brake control means.